United States Patent Office

3,836,677
Patented Sept. 17, 1974

3,836,677
PROCESS FOR MAKING SIMULATED MEAT AND
CHEESE PRODUCTS
James A. Freck, Naperville, and Leonard V. Kondrot,
Chicago, Ill., assignors to American Maize-Products
Company
No Drawing. Filed May 19, 1972, Ser. No. 255,054
Int. Cl. A23l 1/00, 1/10
U.S. Cl. 426—103                                  6 Claims

ABSTRACT OF THE DISCLOSURE

An improved process for preparing simulated meat and cheese products is disclosed. The improvement comprises the inclusion in the product of a high amylose material whereby substantial processing costs are saved.

---

The present invention relates to a new and useful process for the preparation of simulated meat and cheese products especially those formed from vegetable or animal proteins.

Simulated meat products from animal and vegetable proteins have been prepared in the past. One method used commercially is to spin protein fibers from alkaline dispersions from soy proteins and then further process the spun fibers with binders and flavors subsequent to which a further heat treatment is applied. A second process which has been used is to prepare a mixture of soy protein with binders and flavors and form the mixture to shape by extrusion or compaction. The former process is expensive because of the considerable number of manufacturing steps required. The latter process is expensive because of the machinery required for the extrusion or compaction.

In the present invention a comparatively inexpensive process is provided for the production of simulated meat and cheese products. A high amylose material is blended with an animal or vegetable protein. The high amylose material acts as a binder in the product. With the high amylose material, manufacturing costs are substantially reduced. It is not necessary to perform a number of manufacturing steps as was described hereinbefore with respect to the prior art nor is it necessary to use expensive extrusion or compacting apparatuses. This is of great advantage in today's food markets where the price of meats and cheeses is out of the reach of many people and substitute high protein products are highly desirable. It is most important that the substitute high protein products be produced as inexpensively as possible in order that their selling price may be as low as possible.

In addition to food for human consumption, the products of the present invention may be used as veterinary feeds for dogs, cats and the like. It will therefore be understood that the terms "food product" and "food substitute" as used in the present specification and claims includes food products for both human and veterinary use.

For purposes of the present specification and claims, a high amylose material is defined as a mixture of solids which includes at least 50% by weight of pure amylose or amylose derivatives such as hydroxypropyl amylose and amylose ethers, amylose acetates and similar esters. Excellent results have been obtained with an amylose material available under the trademark Amylomaize VII from American Maize-Products Company. This product is a corn starch and contains approximately 70% pure amylose.

Protein materials useful in the present invention include vegetable and animal proteins and proteins of microbiological origin. Suitable vegetable proteins include corn gluten, cottonseed, peanut and soy. Suitable animal proteins include blood, casein, gelatin, collagen, fish meal, and comminuted poultry, pork and beef products.

In accordance with the present invention the high amylose material and the protein material are admixed in aqueous solution and the blend is heated at a temperature at least about 20° F. higher than the gelatinization temperature of the high amylose material. The high amylose material is preferably present in the amount of from about 10% to about 1000% by weight of protein material and best results are obtained when the high amylose material is present in the amount of from about 20% to about 500% by weight of protein material. Additional ingredients such as plasticizers, humectants, food colorings, flavorings and the like are added. Suitable plasticizers include lecithins; sorbitol, mannitol, polyglycols, glycerol, propylene glycol, monoglycerides, and blends of mono- and diglycerides. Suitable humectants include sorbitol, glycerine, polyglycols, corn syrups, and corn syrup solids. Flavorings which may be included are the usual flavoring agents including salt, pepper, sugar, smoke, vitamins, amino acids, polypeptides, partly hydrolyzed proteins and the like.

In the preferred process of the present invention the admixture of protein material and high amylose material is heated in a standard jet cooker at relatively high temperatures for a short period of time. The temperature and period of time should be sufficient to gelatinize a substantial portion of the high amylose material but yet it should not be so long that it will cause an appreciable loss in nutritional value of the protein nor should the protein have appreciable decomposition or degradation. It will be understood that it is not necessary to use a jet cooker and that any cooking system can be used which will achieve the desired result of gelatinizing the high amylose material without appreciably decreasing the nutritional value and/or appreciable decomposing or degrading the protein material. Other suitable equipment useful in the process include swept surface heat exchangers and pressure cookers. A suitable cooker for use in the present invention is the Votator available from the Votator Division of Chemetron Corporation.

The blend of high amylose material and protein material is suitably cooked at a temperature of from about 240° F. to about 450° F. for a period of from about one to about three seconds. The cooked material may then be discharged into ambient conditions or it may be discharged into a cooling bath, preferably aqueous. The temperature of the aqueous cooling bath is suitably from about 32° F. to about 100° F. The consistency of the heated product discharged from the apparatus varies from a liquid to a thick paste depending upon total solids, ratio of protein to starch and nature of the protein. The product will set either under ambient conditions or in the cold water bath to a gelled product and the consistency of the gelled product will depend upon the nature of the product discharged from the jet cooker. Products made with the range of high amylose material as stated in the present invention usually have good slicing characteristics, and good feel, especially a mouth feel simulating cheese or meat cold-cuts. The products are integral and may be breaded, deep-fat fried, etc., and may be incorporated in and/or with other proteinaceous materials for the manufacture of edible products such as meat patties, meat loaves, semi-moist foods, meat pastes and flavors.

The shape of the gelled product will depend upon the shape of the discharge member in the jet cooker and also will vary depending upon whether the cooked product is quenched to atmosphere or immersed in an aqueous bath. Gelled products have been made in the form of shreds, films, ropes, filaments and formed products.

These and other features of the present invention are demonstrated in the Examples which follow.

EXAMPLE 1

A blend of 30 pounds of Amylomaize VII slurry (26.6% dry solids) and 30 pounds of common corn gluten slurry (14% dry solids) was jet cooked at a temperature of about 275° F. for a period of three seconds and was discharged into a water bath having a temperature of about 50° F. A yellow gelled product resembling firmly cooked scrambled eggs was obtained. After oven drying the product had a pleasant, crispy, crunchy texture and a mild cooked flavor. When some of the pieces were immersed in cold water the crisp pieces hydrated resulting in a product with a slightly gristly texture. Other of the dried pieces were dipped into a water solution containing water soluble food dyes. The pieces hydrated and absorbed the dye. The pieces were then again dried and were a suitable food product.

EXAMPLE 2

Example 1 is repeated using a high amylose material comprising 50% amylose acetate in place of the Amylomaize VII. Comparable results are obtained.

EXAMPLE 3

Example 1 is repeated using pure amylose in place of the Amylomaize VIII. Comparable results are obtained.

EXAMPLE 4

A blend of 30 pounds of corn gluten slurry (14% dry solids), 6 pounds of Amylomaize VII and 4.2 pounds water was jet cooked at approximately 275° F. for two seconds and discharged directly into a cold water bath having a temperature of about 50° F. Gelled pieces resembling sauerkraut in appearance were obtained.

EXAMPLE 5

Example 4 is repeated except that there was added to the blend 5 grams of a water soluble dye commonly known as F.D. & C. Red No. 2. Pink colored shreds with the appearance of shredded cabbage were obtained.

EXAMPLE 6

Example 5 is repeated except that in addition to the water soluble food coloring, 5 ml. of smoke flavoring was added. The smoke flavoring is known as Hickory Smoke Imitation P-441 and is available from H. Kohmstamm. The pink colored strands obtained again resembled red cabbage but had a smoke flavor. The strands were placed in jars of water, sealed, sterilized in an autoclave, and, after cooling, were put into a refrigerator. After three weeks the pieces still maintained their integrity, their fresh appearance and pleasing odor.

EXAMPLE 7

A blend of 20 pounds of Amylomaize VII, 5 pounds of acid precipitated food grade casein and 50 pounds of water were jet cooked at about 345° F. for three seconds. After cooking the product was quenched to atmosphere and set up almost immediately. After cooling to ambient temperature, a milk white opaque slightly resilient gel was obtained. The product could be shred without crumbling and had a mouth feel resembling a hard cheese. The protein content of the finished product was 5.2% on an as-is basis.

EXAMPLE 8

Example 7 is repeated except that ground fish meal is substituted for the casein and the cooking is for one second at 240° F. Comparable results are obtained.

EXAMPLE 9

Example 7 is repeated except that comminuted poultry is substituted for the casein. Comparable results are obtained.

EXAMPLE 10

A blend of 20 pounds of Amylomaize VII and 5 pounds of Promine R were jet cooked at about 350° F. for two seconds. Promine R is an acid precipitated soy protein isolate and is available from Central Soya. The cooked blend was discharged directly into containers and set to a very firm solid when it reached ambient temperature. The solid had a hard cheese texture and a protein concentration of 5.5% on an as-is basis.

The product was divided into three lots, one of which was frozen, another refrigerated and a third stored at ambient temperature. After seven days, each of the lots was breaded with a standard breading mixture and deep-fat fried in known manner. In each case products were obtained which were acceptable meat and cheese substitute foods.

EXAMPLE 11

Example 10 is repeated except that the blend is jet cooked at 450° F. for a period of one second. Comparable results are obtained.

EXAMPLE 12

A blend of 20 pounds Amylomaize VII, 20 pounds Promine R and 68 pounds of water were jet cooked as in Example 10. The cooked product was in the form of a thick paste as it emerged from the cooker. A portion of the cooked product was immersed in cold water and a product resulted with a firm homogeneous texture resembling a firm dried cheese such as aged cheddar.

A second portion of the cooked product was quenched to atmosphere and gelled slowly to a firm cake streaked with white starch layers resembling fat.

A third portion of the cooked product was immersed in water while the water was stirred. Pieces, shreds and chunks resulted having a homogeneous texture and appearance.

An additional 620 grams of the hot cooked product was admixed with 186 grams of textured soy chunks. The mixture was cooled and set rapidly to a firm gel in which the soy chunks were swollen and embedded in the product. One portion of the set product was sliced, breaded and deep-fat fried. A second portion of the product was pan fried without breading. This product had a chewy meat-like texture resembling meat loaf. The meat loaf like product was cut into ½ inch square chunks and cooked in boiling water to test its integrity. Even after ½ hours in the boiling water there was no noticeable disintegration of the product. The chunks were also deep-fat fried in the usual way without disintegration of the product.

EXAMPLE 13

A blend of 10 pounds of Amylomaize VII, 30 pounds of Promine R and 68 pounds of water were jet cooked at 350° F. for three seconds. Part of the cooked product was discharged into a water bath and a second portion was quenched to atmosphere. The product chilled in water was a homogeneous gel while the slowly cooled product was interlaced with white gelled starch resembling fat in appearance. The product that was rapidly chilled resembled hamburger in appearance whereas the slow cooled product resembled cheese. Each of the products was reheated to the normal temperature at which meat is served and each product had a chewy texture resembling cooked meat.

EXAMPLE 14

Example 13 is repeated except that the temperature of cooking is 450° F. Comparable results are obtained.

EXAMPLE 15

Example 13 is repeated except that comminuted pork is substituted for the Promine R. A comparable product is obtained.

EXAMPLE 16

One half of a blend of 5 pounds of Amylomaize VII, 15 pounds of Promine R and 45 pounds of water were jet cooked at 350° F. for three seconds into 60–65° F. water. To the remaining blend 12 grams of dye (Burnt Sugar Shade, National Aniline) were added and jet cooking into water continued. A chocolate brown homogeneous gelled product was obtained.

Both the dyed and undyed products resembled ground beef in appearance. Meat loafs and pork sausage patties were prepared from both products using 50% meat. No objectionable flavor or odor was noted with the test products.

Acceptable meat loaf and pork sausage products were obtained. The pork sausage containing the gelled products showed less shrinkage on frying. Cooked meat loafs containing the gelled products retained more fat and moisture than the meat loafs made with meat alone.

A rice dish was prepared using the uncolored, gelled product as a meat additive.

A package mix, Rice-A-Roni (available from Golden Grain Macaroni Co.) Chicken flavor, was prepared according to package directions. One and ½ cups (154 grams) of gelled product were added to the rice mixture 10 minutes before the end of the recommended cooking time of 15 minutes. The gelled product had absorbed a yellow pigment during the cooking and had the appearance and eating quality of scrambled eggs.

EXAMPLE 17

A blend of 10 pounds of Amylomaize VII, 5 pounds of Promine R and 35 pounds of water were jet cooked at 250° F. for three seconds. Samples of the thick cooked paste were collected in cans and cooled in the refrigerator. Firm, but friable gels containing white marbling were obtained which were then cut in cubes and deep-fat fried without losing their integrity. Other groups of the cubes were moistened with water or milk and shaken with a commercial dry coating (e.g., Shake-and-Bake, available from General Foods) and deep-fat fried. All the products were acceptable food products with an acceptable texture and flavor.

EXAMPLE 18

A blend of 10 pounds of Type B dried Torula Yeast, 30 pounds of water and 3½ pounds of Amylomaize VII were jet cooked for three minutes at 350° F. The product was discharged into cans which were then refrigerated. The thick paste product set to firm pastes with gel character. The product resembled a very stiff cream cheese but could be sliced easily and cleanly. The product had the texture of a meat paste when spread on crackers or bread. The product had an internal meat-like aroma and flavor making it suitable as a flavor additive.

EXAMPLE 19

Example 18 was repeated except that seven pounds of Amylomaize VII, seven pounds of dried yeast and 30 pounds of water were used. A comparable product was obtained.

It will be understood that the claims are intended to cover all changes and modifications of the preferred embodiments of the invention, herein chosen for the purpose of illustration, which do not constitute departures from the spirit and scope of the invention.

What is claimed is:

1. A process for preparing a food product comprising:
   (a) admixing in aqueous slurry a blend comprising a plurality of pieces of edible protein material having a protein content of at least as high as the protein content of comminuted beef, and from about 10% to about 1000% by weight of protein material of a high amylose material containing at least about 50% amylose or an amylose derivative;
   (b) cooking the blend at a temperature and for a period of time sufficient to gelatinize a substantial portion of the high amylose material without appreciable loss in nutritional value of the protein and without appreciable decomposition or degradation of the protein; and
   (c) cooling the cooked product;
   (d) whereby an integral product comprising the pieces of portein material bound together with high amylose material is obtained.

2. The process of claim 1 wherein the blend is cooked in a jet cooker at a temperature of from about 275° F. to about 450° F. for a period of from about one to about three seconds.

3. The process of claim 1 wherein the blend additionally comprises plasticizers, humectants and flavorings.

4. The process of claim 1 wherein the cooling is done in an aqueous medium.

5. The process of claim 1 wherein the high amylose material is present in the amount of from about 20% to about 500% by weight of protein material.

6. A food product prepared by the process of claim 1.

References Cited

UNITED STATES PATENTS 3,368,909    2/1968    Moore et al. _____ 99—108 UX

JAMES R. HOFFMAN, Primary Examiner

U.S. Cl. X.R.

426—92, 93, 104, 274